Patented Nov. 6, 1923.

1,473,251

UNITED STATES PATENT OFFICE.

SAMUEL PEACOCK, OF WHEELING, WEST VIRGINIA, ASSIGNOR TO WHEELING STEEL CORPORATION, OF WHEELING, WEST VIRGINIA, A CORPORATION OF WEST VIRGINIA.

HARDENED THREADED SOCKET AND PROCESS OF PRODUCING SAME.

No Drawing.　　　Application filed December 6, 1922.　Serial No. 605,287.

*To all whom it may concern:*

Be it known that I, SAMUEL PEACOCK, a citizen of the United States, residing at Wheeling, in the county of Ohio and State of West Virginia, have invented certain new and useful Improvements in Hardened Threaded Sockets and Processes of Producing Same; and I do hereby declare the following to be a full, clear, and exact description of the invention, such as will enable others skilled in the art to which it appertains to make and use the same.

This invention relates to hardened threaded sockets for joining pipe sections and to a process of producing the same, and has for its object to provide an article of this kind as well as a procedure for making such article that will be more efficient in practice and less expensive to carry out than those heretofore proposed.

With these and other objects in view the invention consists in the novel combination of parts constituting the socket and in the novel procedures constituting the process, all as will be more fully hereinafter disclosed and particularly pointed out in the claims.

In order that the invention may be the more clearly understood it is said:—In the joining of pipe sections, of relatively large diameters of say between 5 and 12 inches, it is found necessary to thread the ends of the sections in order to properly join thereto the screw threaded sockets now commonly used and which fit the threaded end of the pipe sections to be connected.

But, these pipe sections at present are made from what is known as "mild steel." That is, a steel having about one tenth of one percent of carbon. The quantity of carbon in this steel is therefore too low to render feasible the chill hardening of the threaded end of these sections by the usual procedure. The result is that as now commonly practiced, the threaded ends are provided with screw threads that are so soft that when the sockets are screwed on and screwed off under great power, which it is necessary to employ in practice, the threads often become torn, worn, or broken, and even the ends of the pipe themselves are sometimes broken.

In carrying out this invention, I make the pipe as heretofore, out of say one tenth per cent carbon steel or mild steel, as above mentioned, I screw thread the same in the ordinary manner, and I further prepare and screw thread the mild steel sockets in the manner heretofore employed. I next prepare a mixture of ferro-nickel, and carbon in the well known manner, either by mixing the same with a vehicle such as water, oil, etc., or I prepare a bed of said ferro-nickel and carbon. I then cover or coat the screw threaded sockets of mild steel with said ferro-nickel and carbon, and especially their thread portions, and I insert the same in a furnace of such character as will cause an alloy of the nickel and steel to be formed on the surfaces of said sockets. That is to say, I heat the threaded sockets to a temperature as high as 1700° F. at which point an alloy of nickel and steel is formed, and I so limit the amount of ferro-nickel or so limit the time of action of the said ferro-nickel on the sockets as will produce only a surface action or alloying between the steel and nickel. It is well known that when nickel is alloyed with steel in the manner above disclosed, it will cause an increase in the volume, as well as in the density of the steel surface, while it will also greatly toughen the steel, and therefore, the screw threads of the sockets will not be suitable without further treatment for joining the said threaded pipe sections. That is, the size of said threads being changed, it is found to be necessary to subject them to a polishing or abrading process by which they are brought back to the standard gage.

I therefore preferably grind the threads to the standard gage after the alloying action has taken place. It will thus be seen that I produce a threaded nipple or socket having an inner skin of ferro-nickel alloy and an outer softer body portion of mild steel. Of course, a mixture of carbon and ferro-molybdenum or ferro-chrome and carbon may be employed, instead of the ferro-nickel and carbon, but I prefer the latter.

It will now be seen that by proceeding as above outlined, one is enabled to produce at a relatively low cost screw threaded sockets having outer tough, strong and hard surfaces, with a relatively soft steel body portion, which renders said sockets peculiarly adapted for standing the great strains that are brought on them during the process of putting them on and off pipe sections of large diameters. And it will further be clear that the subsequent grinding or polishing action to bring the screw threads to a standard gage causes these relatively hard threads to have a smooth even surface which works over the screw threads of the sections with less friction and with greater facility than heretofore.

It is obvious that those skilled in the art may vary the details of the construction of the article, as well as the procedure of making the same, without departing from the spirit of the invention, and therefore, I do not wish to be limited to the above disclosure except as may be required by the claims.

What I claim is:—

1. The process of providing sockets made of soft steel with relatively hard and smooth screw threads which consists in screw threading the soft steel of said sockets; alloying nickel with the surface portion of said soft steel threads to harden and toughen the same; and subjecting the hardened threads to a polishing action to reduce them to a predetermined standard gage.

2. The process of making surface hardened sockets for joining screw threaded pipe sections which consists in making said sockets of soft steel and screw threading the same; alloying nickel with the surface portions of said sockets including their screw threads; and subjecting the latter to a mechanical reducing action to bring them to a predetermined standard gage.

3. The herein described new article of manufacture, the same consisting of a soft steel screw threaded socket having a hardened, polished, screw threaded surface of an alloy of nickel and steel joining its softer main body portion.

4. The process of providing sockets made of soft steel with relatively hard and smooth screw threads which consists in screw threading the soft steel of said sockets; alloying a metal with the surface portion of said soft steel threads to harden and toughen the same; and subjecting the hardened threads to a polishing action to reduce them to a predetermined standard gage.

5. The herein described new article of manufacture the same consisting of a soft steel screw threaded socket having a hardened, polished, screw threaded surface of an alloy of a hardening and toughening metal with said steel, said alloy integrally joined to the softer steed main body portion of the socket.

In testimony whereof I affix my signature.

SAMUEL PEACOCK.